Patented July 5, 1949

2,474,868

UNITED STATES PATENT OFFICE 2,474,868

HYDROCARBON CONVERSION WITH STEAM-TREATED KAOLIN

Hubert A. Shabaker, Media, Pa., assignor to Houdry Process Corporation, Wilmington, Del., a corporation of Delaware No Drawing. Application December 13, 1946, Serial No. 716,189

3 Claims. (Cl. 196—52)

The present invention relates to processes of hydrocarbon conversion employing cracking catalysts including such processes in which hydrocarbons of lower boiling point and lower molecular weight are produced from heavier petroleum oils of higher boiling point as well as processes wherein petroleum hydrocarbons boiling in the range of naphtha or gasoline are treated with cracking catalysts under cracking conditions to effect principally improvement in quality of the product, such as increased antiknock value, improvement in lead susceptibility, desulphurization, or increase in olefinicity.

Although a large number of substances of natural and synthetic origin have been proposed in the prior art for use in cracking and reforming of hydrocarbons, the cracking catalysts in commercial use are principally synthetic gels comprising composites of silica and alumina, and special types of clay constituted by the sub-bentonites of the montmorillonite family, which clays are activated by acid-treatment to produce catalysts of required high activity.

As opposed to these sub-bentonite clays, which can be brought to desired high activity level by acid treatment, there exists a number of common and abundant clays such as kaolin clays and other related clays and clay minerals which are not classed as acid-activable, since their absorptive and decolorizing properties as well as the catalytic activity of these clays are not enhanced by conventional acid treatment to anywhere near the extent observed with the commercial sub-bentonites. Even those kaolin clays which do show after acid treatment a comparatively higher improvement in catalytic activity for kaolin clays, are distinguishable from the sub-bentonites referred to in that the extent or severity of the acid treatment in the case of these kaolin clays has no marked effect on catalytic properties.

It has been suggested in the patent literature to employ kaolin clays, as well as certain related clay minerals, as catalysts in hydrocarbon conversion operations, but because of the relatively low yields of desired hydrocarbon conversion products obtained therewith and otherwise poor selectivity and performance exhibited, these suggested materials have not been commercially employed for such use to any significant extent.

It has now been discovered that clays of the kaolin type, as well as the related clays and clay minerals such as hereinafter identified, can be prepared as cracking catalysts of unique and desirable properties, offering in many instances and for some purposes important advantages over prior commercial cracking catalysts. In accordance with the invention these clays are subjected in raw state to steam treatment at selected temperature, giving rise to valuable cracking catalysts of improved activity and desired selectivity and having other beneficial properties more particularly utilized in cracking certain types of charge stocks as will hereinafter appear.

Besides the immediate economic advantages afforded as a result of utilizing cheaper and common clays and the facility of preparing the same as catalysts by a simple steaming operation, the kaolin clays utilized in accordance with the invention offer additional advantages incident to their comparatively high densities, accompanying high heat capacity, and high temperatures of incipient fusion, particularly as compared with the acid-activated montmorillonite clays now commercially employed as hydrocarbon conversion catalysts.

The clays and clay minerals with which the present invention is concerned are herein referred to as "kaolins" or "kaolin clays" it being understood, however, that the terms as herein employed include clays which in the raw state contain as the principal clay mineral constituent present therein kaolinite, dickite, nacrite, or anauxite. These clay minerals are all hydrous aluminum silicates in their uncalcined form and may be represented by the formula $Al_2O_3.2SiO_2.2(H_2O)$. The indicated formula gives a weight ratio of $SiO_2/Al_2O_3$ of about 1.16 and the various naturally occurring clays of the invention generally fall within a $SiO_2/Al_2O_3$ ratio of about 1.0 to about 1.5. In clays which have montmorillonite as their characteristic clay mineral constituent, such as the bentonite and sub-bentonite clays, the ratio of $SiO_2/Al_2O_3$ is generally higher than 2.0 and usually about 2.5 to 5.5. It will be understood, of course, that the kaolin clays employed may contain in addition to the silica and alumina components, minor proportions of other substances, particularly compounds of iron, calcium, magnesium, and alkali metal compounds.

The gasoline activity and other performance characteristics of cracking catalysts can be determined and compared by test on a standard petroleum fraction. One such test in common use is that known as the "CAT-A" method, described in an article by J. Alexander and H. G. Shimp in National Petroleum News, Technical Section, August 2, 1944; at p. R-537. In accordance with the described test, a standard light East Texas gas oil is cracked at 800° F. and atmospheric pressure at a liquid space rate per hour of 1.5 during a period of ten minutes. The yield of motor gasoline (410° F. cut point) distilled from the liquid products is measured and the activity of the catalyst designated in terms of the volume per cent of such gasoline yield to the volume of oil charged. The "coke" deposited on the catalyst is determined by conversion to $CO_2$ and expressed in weight per cent of charge. The gravity (referred to air) of the gaseous by-products is also determined and the weight per cent of gas calculated from the measured volume and gravity. Designations of catalytic activity in the present specification have reference, unless otherwise indicated, to that determined by the described method.

The improved catalysts used in accordance with the present invention are obtained by the simple process of subjecting the kaolin clay in raw state to an atmosphere comprising steam. As a result of the treatment contact masses of enhanced catalytic activity are obtained, giving excellent gasoline to coke ratios in cracking of hydrocarbons. The catalysts thus obtained, furthermore, are exceptionally stable against deactivation by steam normally encountered in conventional hydrocarbon cracking and other hydrocarbon treating operations; steam being formed in the cracking operation and/or often added to the charge stock.

It has already been proposed in U. S. Patent No. 2,375,757, issued to John R. Bates, May 15, 1945, to precondition active cracking catalysts for use in conversion reactions in selected types of charging stocks, by treatment of the catalytic material at high temperature in an atmosphere including steam, thereby to decrease the coke-producing properties of these catalysts. By the described treatment of the catalysts therein disclosed, including synthetic gels and acid-activated montmorillonite clays, the cracking activity of the catalyst as measured by gasoline yield in cracking of a light gas oil, however, is generally lowered.

Since kaolin clays are already of low activity as compared with commerical cracking catalysts of the synthetic or acid-activated montmorillonite type, steam treatment of these kaolin clays would be expected to further reduce their activity so as to render the same wholly useless as cracking catalysts. I have made the surprising discovery, however, that the kaolin clays from which the catalysts of the present invention are prepared are unique in this respect, in that while steam treatment of the raw clay also effects marked improvement in the gasoline to coke and gasoline to gas ratios, the gasoline yield activity is also substantially increased. In further contrast to these kaolin clays, steam treatment of raw montmorillonite and fuller's earth clays, which may have low catalytic activity in the raw state, brings about a marked reduction in gasoline producing catalytic properties, often as low as half or even less than half of the activity exhibited by the same clays when calcined in air.

To obtain all of the desired beneficial effects of the steam treatment, it is necessary to employ the steam at elevated temperatures as at about 1250° F. or above. Temperature above about 1650° F. may be detrimental for some of these kaolin clays. Optimum improvement in gasoline to coke ratios at comparatively high levels of gasoline yield is usually obtained by treatment for 2 to 4 hours at 1350° to 1450° F. at atmospheric pressure in 100% steam or in an atmosphere consisting principally of steam but containing air or other gas substantially inert with respect to the kaolin clay being treated. Observable and significant improvement in desired selectivity with increase in gasoline yields as well as in gasoline to coke ratio is often brought about by treatment at these temperatures when the fluid treating medium contains as low as 5% steam. With the lower concentrations of steam, the contact time for the treatment is preferably extended to about 8 to 12 hours. In all cases, however, with high or low concentration of steam, and as long as critically high temperatures causing rapid shrinkage or sintering of the clay are avoided, longer periods of treatment than above designated apparently have no adverse effect.

The kaolin clay may be subjected to the prescribed steam treatment in any desired form, such as finely divided powder, lumps, or uniformly shaped masses, but it is preferred to carry out the treatment on the clay already in the shape or condition in which it is to be employed as catalyst in the hydrocarbon conversion process. Thus, for use in types of operations employing uniformly shaped aggregates of catalyst such as pellets, the raw kaolin may be admixed with water to proper consistency and extruded as strands which are cut to desired lengths. The pellets thus formed can then be simply dried and steam treated as above indicated and are ready for use as catalysts.

Different kaolin clays and clay minerals are not improved to the same extent nor to the same desired high catalytic level of gasoline yield, but in all instances the characteristic marked improvement in gasoline to coke ratio is exhibited. Since the coke formed in a hydrocarbon conversion operation is not essentially recoverable for practical use, it represents loss of charge in the production of waste material, which has an important bearing on the economics of the commerical operations.

The kaolin employed in the following example was obtained from a desposit in the vicinity known as "Eccles Estate" situated in Putnam County, Florida. Different samples of the clay analyzed had the following general composition based on clay weight at 105° C.

TABLE 1

| | 1 | 2 | 3 |
|---|---|---|---|
| | Low Sand Sample | Smaple Containing 15–18% sand | Same as 2 Calculated on Sand-Free Basis |
| | Percent | Percent | Percent |
| Ign. Loss at 1600° F | 13.3 | 10.36 | 12.00 |
| $SiO_2$ | 46.6 | 59.0 | 43.0 |
| $Al_2O_3$ | 41.1 | 29.3 | 34.9 |
| $Fe_2O_3$ | 0.42 | 1.25 | 1.49 |
| CaO | 0.48 | 0.21 | 0.28 |
| MgO | 0.25 | 0.19 | 0.23 |
| $Na_2O$ | undet. | 0.06 | 0.07 |
| $TiO_2$ | undet. | 0.52 | 0.62 |

*Example I*

A sample of raw Eccles kaolin containing about 15 to 18% sand was ground and admixed with about 28% its dry weight of water. The mix was extruded into strands which were cut into 4 mm. pellets and dried.

(a) A portion of the dried pellets were then subjected to treatment in an atmosphere of 100% steam for 4 hours at about 1350° F.

(b) Another portion of the dried pellets were treated with 100% steam at 1450° F. for 4 hours.

(c) Similar pellets were treated at 1400° F. for 10 hours in air containing 5% steam.

(d) For comparison of the effect of the steam treatment, similar pellets as above were calcined in air in conventional manner.

The catalytic cracking activity of the steam treated pellets above are compared in the following table with the pellets which were not steam treated.

TABLE 2

| Steam Treat | "CAT-A" Activity | | | | Gasoline to coke ratio |
|---|---|---|---|---|---|
| | Gasoline, percent vol. | Coke, percent wt. | Gas, percent wt. | Gas Grav. | |
| (a) 1350° F.—4 hrs.—100% | 26.6 | 1.2 | 2.5 | 1.35 | 22.2 |
| (b) 1450° F.—4 hrs.—100% | 23.9 | 1.1 | 2.4 | 1.23 | 21.7 |
| (c) 1400° F.—10 hrs.—5% | 26.6 | 2.4 | 5.5 | 1.07 | 11.1 |
| (d) Air calcine only | 21.0 | 2.7 | 5.6 | 0.82 | 7.8 |

It will be seen from the above table, that marked improvement in gasoline to coke ratio as well as better yields of gasoline with lower gas production and better gas gravities are obtained by the use of the steam treated kaolin. Low gas gravities are indicative of the presence of large quantities of hydrogen and low molecular weight hydrocarbons in the gas formed, which are less valuable and less desirable than gaseous $C_3$ and $C_4$ hydrocarbons.

Other kaolin clays compared as to cracking activity after calcination in air and after a steam treatment in accordance with the invention, showed characteristics similar to the Eccles kaolin of Example I. Among the clays so treated and tested for catalytic activity were a number of commercially known kaolins, including: "Edgar EPK" (from Edgar mines, Putnam County, Florida), and "Wade No. 5" (Kentucky-Tennessee clay mines). The analysis of each of these clays is given below on a dry weight basis:

TABLE 3

| | Edgar EPK | Wade #5 |
|---|---|---|
| Ign. Loss, per cent | 15 | 16.0 |
| Si as per cent $SiO_2$ | 47 | 43.8 |
| Al as per cent $Al_2O_3$ | 37 | 35.9 |
| Fe as per cent $Fe_2O_3$ | 0.8 | 0.96 |
| Ca as per cent $CaO$ | 0.2 | 0.12 |
| Mg as per cent $MgO$ | 0.2 | 0.07 |
| Na as per cent $Na_2O$ | 0.2 | 0.41 |
| K as per cent $K_2O$ | | 1.76 |
| Ti as per cent $TiO_2$ (approx. 3% quartz) | 0.2 | 0.73 |

Each of the above clays was tested by the "CAT-A" method after air calcination and after a 100% steam treatment at 1350° F. for 4 hours in accordance with the invention; the results obtained are compared below:

TABLE 4

| Kaolin Clay Treated | "CAT-A" Activity | | | | Gasoline to coke ratio |
|---|---|---|---|---|---|
| | Gasoline, percent vol. | Coke, percent wt. | Gas, percent wt. | Gas Grav. | |
| "Edgar EPK": | | | | | |
| Air Calcined | 10.9 | 3.6 | 3.3 | 0.43 | 3.03 |
| Steam | 19.4 | 1.2 | 2.4 | 0.83 | 16.2 |
| "Wade #5": | | | | | |
| Air Calcined | 19.9 | 1.4 | 2.6 | 0.93 | 14.2 |
| Steam | 23.2 | 1.1 | 2.1 | 1.15 | 21.1 |

In addition to the better gasoline yields, low gas production, and enhanced gasoline to coke ratios obtained, the steam treated catalysts of the invention also exhibit remarkable steam stability, which is of major importance in practical catalytic cracking operations. For instance, the same Eccles kaolin was similarly made into 4 mm. pellets as in Example I and treated with 100% steam at 1350° F. for 4 hours. The catalyst pellets so obtained were tested for stability to steam by an accelerated aging method, with the following results.

TABLE 5

| | "CAT-A" Activity | | | |
|---|---|---|---|---|
| | Gasoline, percent vol. | Coke, percent wt. | Gas, percent wt. | Gas. Grav. |
| Prepared Pellets: | | | | |
| after 4 hours—100% steam, 1350° F | 24.9 | 1.1 | 2.8 | 1.31 |
| after 950° F. 300 hrs. —100% steam | 26.4 | 1.5 | 3.4 | 1.4 |
| after 950° F. 1000 hrs. —100% steam | 25.5 | 1.3 | 3.6 | 1.38 |
| after 950° F. 1500 hrs. 100% steam | 26.7 | 1.3 | 2.5 | 1.43 |

The high gasoline to coke ratios obtained, as shown by "CAT-A" results, with the steam-treated kaolins indicates that they furnish excellent catalysts for cracking heavy petroleum stocks, such as those boiling generally above 400° F. and having an atmospheric dew point above about 800° F. (As used herein, the term dew point has reference to the temperature below which formation of liquid takes place in a hydrocarbon mixture at atmospheric pressure. It will be understood, of course, that to avoid thermal decomposition the dew point at atmospheric pressure is usually calculated from data obtained at reduced pressure, on a hydrocarbon mixture free from other materials.) The results obtained in cracking a heavy gas oil fraction under substantially identical conditions with steam-treated pellets of Eccles kaolin (prepared as in Example Ia) and a steam-treated pelleted silica-alumina synthetic catalyst, are compared in the following table. The indicated results were obtained on cracking a heavy stock at a temperature of 850° F., pressure of 10 lbs. per square inch gauge, at the liquid space velocity (volume of charge per volume of catalyst per hour) of about 1, ten minute on-stream periods alternating with catalyst regeneration; about 9% by weight of steam being added to the charge stock. The stock charged was a fraction from an East Texas crude oil, from which up to 42% of the light low boiling materials and 12% of the bottoms had been removed (dew point about 870° F., A. P. I. gravity 31.0).

TABLE 6

| Yield Data | Synthetic "CAT-A" Activity About 30 | Eccles Kaolin "CAT-A" Activity About 25 |
|---|---|---|
| 10# RVP Motor Gasoline (365° F. at 90%) per cent vol. chg | 34.8 | 34.2 |
| Liquid recovery per cent vol. chg | 92.3 | 94.1 |
| Dry Gas, wt. per cent chg | 9.1 | 8.4 |
| Coke deposit, wt. per cent chg | 3.4 | 2.9 |
| CFR-M Octane (clear) | 79.6 | 78.5 |
| CFR-39R (clear) | 91.2 | 90.1 |

The clay pellets, apparently because of the "flywheel effect" of the high density and the accompanying high heat capacity of the kaolin, showed a notable evenness of regeneration throughout the catalyst bed, with temperatures of regeneration throughout the bed varying only slightly from the 915° F. maximum recorded, the operation being notably free from any pronounced zone-burning.

This high density and high heat capacity of catalyst made from certain kaolins can be advantageously utilized in operations for catalytic cracking and other catalytic treating of hydrocarbons, wherein the heat required in the endothermic reaction is essentially supplied by the contact mass. Generally, in such processes, as described in the prior literature and patented art, an inert high heat capacity refractory material is added to the active catalyst to obtain the desired volumetric heat capacity. In a copending application Serial No. 651,662, filed March 21, 1946, certain forms of apparatus and operating process are described in which use is made of contact masses in the form of mixtures or composites having heat capacities of greater than 0.45 B. t. u./liter/°F. Catalysts prepared from certain kaolines can be advantageously used in the systems described in that application, without necessitating admixture or incorporation of inert heat capacity materials. Thus, operating at the same relative throughput, "Eccles" kaolin having a "CAT-A" activity of about 25% gasoline and acting as its own heat capacity mass, produced as much gasoline as a mixture of 72% by volume of synthetic silica-alumina catalyst (of 35% gasoline "CAT-A" activity) and 28% of inert heat capacity material (a commercial refractory of electrically fused alumina containing about 25% silica). The yields obtained on cracking a fraction from an Illinois crude oil from which 44% of the lighter components and 13% of the bottoms had been removed, are compared in the following table. Also tabulated are yields obtained with a 45% increase in throughput with the steam-treated kaolin catalyst and slight compensating change in cracking conditions.

TABLE 7

| Catalyst | Admixed Synthetic SiO₂-Al₂O₃ + inert | Eccles Kaolin | |
|---|---|---|---|
| Apparent Density of Catalyst (only) | 0.59 | 1.02 | |
| Relative throughput (based on reactor volume) | 1.00 | 1.03 | 1.45 |
| 10# R. V. P. Motor Gasoline (365° F. at 90%) percent vol. chg | 42.0 | 41.1 | 42.0 |
| Liquid recovery, percent vol. chg | 88.6 | 89.6 | 92.1 |
| Dry gas, weight percent chg | 13.4 | 12.6 | 9.5 |
| Coke, weight percent chg | 4.3 | 4.3 | 3.4 |
| CFR, MM octane (clear) | 81.2 | 81.9 | 81.7 |
| CFR, 39R octane (clear) | 90.5 | 91.6 | 93.0 |
| Operating Conditions: | | | |
| Space Rate, Vol./V. Cat./Hr | 0.95 | 0.71 | 0.96 |
| Temperature, °F | 840 | 840 | 850 |
| Pressure, p. s. i. ga | 7 | 7 | 7 |
| Steam, weight percent chg | 15 | 15 | 10 |
| Time, minutes | 10 | 10 | 10 |

Even more severe cracking conditions than given above can be employed with these kaolin catalysts, since the resulting higher quantity of coke deposited can be completely burned off at maximum regeneration temperatures, which do not detrimentally affect the catalyst.

In using the contact masses prepared in accordance with the invention as catalysts in hydrocarbon conversion processes the ordinary conditions employed with present commercial catalysts can be followed as to time, temperature, etc. As an example of a fixed catalyst bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Virgin or cracked gasoline or naphtha fractions may be improved in accordance with the invention by treating the same under conditions similar to those employed in cracking. In all of these processes, the catalyst after use is regenerated by contacting it with air or other oxygen-containing gas to burn off carbonaceous deposits.

Because of the comparatively high temperatures to which these kaolins can be subjected without surface fusion and because of the excellent heat capacity incident to the high density of these catalysts, moreover, the usual operating conditions can be safely stepped up, since the larger quantity of coke laid down under the more severe operating conditions can be adequately handled at increased regeneration temperature without untoward effect on the catalyst.

Obviously many modifications and variations of the invention as hereinbefore set forth may be made without departing from the spirit and scope thereof and therefore only such limitations should be imposed as are indicated in the appended claims.

I claim as my invention:

1. The method of converting hydrocarbons of higher boiling point into products boiling in the range of gasoline which comprises contacting under catalytic cracking conditions a charge stock containing such higher boiling hydrocarbons, with a catalyst comprising a kaolin clay which has been pretreated with steam at a temperature within the range of about 1250–1650° F. for at least about 2 hours.

2. The method of cracking heavy hydrocarbon oils having an atmospheric dew point above about 800° F. which comprises; subjecting such hydrocarbon oils to contact under catalytic cracking conditions with a catalyst comprising a kaolin clay which has been treated with steam at a temperature within the range of about 1250° to 1650° F. for at least about 2 hours.

3. The method of converting petroleum hydrocarbons of boiling point higher than gasoline to hydrocarbon products boiling in the range of gasoline, which comprises contacting said higher boiling hydrocarbons with catalyst made of a pelleted kaolin clay, at temperature in the range of 700° to 1100° F., at a liquid space rate of about 0.5 to about 8, said kaolin clay having been treated for 2 to 4 hours at 1350° to 1450° F. in an atmosphere consisting essentially of steam.

HUBERT A. SHABAKER.

REFERENCES CITED

The following references are of record in the file of this patent:

UNITED STATES PATENTS

| Number | Name | Date |
|---|---|---|
| 2,375,757 | Bates | May 15, 1945 |

FOREIGN PATENTS

| Number | Country | Date |
|---|---|---|
| 490,853 | Great Britain | Aug. 23, 1938 |